United States Patent
De Barros et al.

(10) Patent No.: US 10,726,021 B2
(45) Date of Patent: Jul. 28, 2020

(54) OPTIMIZED MOBILE SEARCH

(71) Applicant: Microsoft Technology Licensing, LLC, Redmond, WA (US)

(72) Inventors: Marcelo De Barros, Redmond, WA (US); Prateek Tiwari, Sammamish, WA (US); Shruti Malugu, Issaquah, WA (US)

( * ) Notice: Subject to any disclaimer, the term of this patent is extended or adjusted under 35 U.S.C. 154(b) by 504 days.

(21) Appl. No.: 15/047,625

(22) Filed: Feb. 19, 2016

(65) Prior Publication Data

US 2017/0169031 A1   Jun. 15, 2017

Related U.S. Application Data

(60) Provisional application No. 62/267,278, filed on Dec. 14, 2015.

(51) Int. Cl.
G06F 16/2457 (2019.01)
G06F 16/957 (2019.01)
H04L 29/08 (2006.01)

(52) U.S. Cl.
CPC .... G06F 16/24578 (2019.01); G06F 16/9574 (2019.01); H04L 67/02 (2013.01); H04L 67/2847 (2013.01); H04L 67/306 (2013.01)

(58) Field of Classification Search
None
See application file for complete search history.

(56) References Cited

U.S. PATENT DOCUMENTS

| | | | |
|---|---|---|---|
| 6,067,565 A | 5/2000 | Horvitz | |
| 6,385,641 B1 | 5/2002 | Jiang et al. | |
| 7,120,871 B1 | 10/2006 | Harrington | |
| 2006/0101341 A1 | 5/2006 | Kelly et al. | |
| 2006/0259867 A1 | 11/2006 | Watson et al. | |
| 2008/0005672 A1 | 1/2008 | Mestres et al. | |
| 2011/0173569 A1* | 7/2011 | Howes | G06F 17/30902 715/835 |
| 2011/0238662 A1 | 9/2011 | Shuster et al. | |

(Continued)

OTHER PUBLICATIONS

Rendle, Robin, "CSS-Tricks", Published on: Sep. 2, 2015 Available at: https://css-tricks.com/prefetching-preloading-prebrowsing/.
"Make webpages load faster", Published on: Jul. 23, 2015 Available at: https://support.google.com/chrome/answer/1385029?hl=en.
"Prerender and prefetch support", Published Date: Jul. 23, 2015 Available at: https://msdn.microsoft.com/en-us/library/dn265039(v=vs.85).aspx.

(Continued)

Primary Examiner — Thu N Nguyen
(74) Attorney, Agent, or Firm — Shook, Hardy & Bacon, LLP

(57) ABSTRACT

Techniques for optimizing delivery of online content to a mobile client device. In an aspect, a search application on the client device receives a user query, which is submitted to a server over a communications channel. The server retrieves a plurality of ranked search results relevant to the user query, and returns the search results to the client device. The search application further pre-fetches from the server and/or pre-renders content associated with a top plurality of the ranked search results, such that content may be instantly displayed at the client device if requested by the user. The identification and ranking of relevant search results by the server may be performed based on information provided by the client device that is customized to the user and/or the scenario, e.g., user account name, geographical location, device capabilities, etc.

20 Claims, 8 Drawing Sheets

(56) References Cited

U.S. PATENT DOCUMENTS

| | | | |
|---|---|---|---|
| 2012/0084343 A1 | 4/2012 | Mir et al. | |
| 2012/0117057 A1* | 5/2012 | Adimatyam | H04N 21/4147 707/723 |
| 2012/0316955 A1* | 12/2012 | Panguluri | G06Q 30/02 705/14.41 |
| 2013/0007260 A1 | 1/2013 | Jain et al. | |
| 2013/0246383 A1* | 9/2013 | White | G06F 17/30867 707/706 |
| 2014/0372511 A1 | 12/2014 | Kapadia et al. | |
| 2015/0193395 A1 | 7/2015 | Nicolaou et al. | |
| 2015/0358757 A1* | 12/2015 | Ford | H04L 67/36 455/418 |
| 2016/0042334 A1* | 2/2016 | Westby | G06Q 10/087 705/21 |
| 2017/0041413 A1* | 2/2017 | Chandhok | H04L 67/26 |

OTHER PUBLICATIONS

Sarukkai, Ramesh R., "Link prediction and path analysis using Markov chains", In Journal of Computer Networks, vol. 33, Issue 1-6, Jun. 2000, 2 pages.

Lieberman, Henry, "Letizia: An Agent That Assists Web Browsing", In AAAI Technical Report FS-95-03, Mar. 27, 1995, pp. 97-102.

Markatos, et al., "Top-10 Approach to Prefetching the Web", In Proceedings of Internet Summit, Jul. 21, 1998, 10 pages.

"Second Written Opinion Issued in PCT Application No. PCT/US2016/063805", dated Nov. 20, 2017, 5 Pages.

"International Search Report and Written Opinion Issued in PCT Application No. PCT/US2016/063805", dated Mar. 7, 2017, 10 Pages.

* cited by examiner

//OPTIMIZED MOBILE SEARCH

BACKGROUND

Software developers are continuously working to improve users' experience in accessing the Internet via mobile devices. One commonly encountered problem is limited network connection speed, which undesirably causes latency between when a user requests data, and when that data is available to the user. To address this problem, pre-fetching and pre-rendering techniques may be employed to predict what data a user will request from a server, and make such data available on the mobile device before the user actually requests it.

Prediction schemes include, e.g., pre-fetching and pre-rendering all Uniform Resource Locators (URL's) currently visible on a browser webpage, or all URL's associated with a "whitelist" of commonly accessed webpages, etc. The accuracy of such prediction schemes directly impacts device bandwidth and power consumption, since downloading and rendering content not subsequently accessed by the user unnecessarily wastes system resources.

Accordingly, it would be desirable to provide techniques to improve the prediction accuracy of content pre-fetching and pre-rendering schemes, thereby enhancing users' online browsing experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a search application on a client device receives a user query for online content. The user query is submitted to a server, which returns a plurality of ranked search results relevant to the user query. Prior to user selection of any particular search result for further browsing, the search application pre-fetches content from the server associated with one or more of the most highly ranked search results. The search application may further pre-render such content so that it may be instantly displayed by the client device if requested by the user.

The identification and ranking of relevant search results by the server may be performed based on information provided by the client device that is customized to the user and/or the scenario, e.g., user account name, geographical location, device capabilities, etc.

Other advantages may become apparent from the following detailed description and drawings.

DETAILED DESCRIPTION

Various aspects of the technology described herein are generally directed towards techniques for pre-fetching and pre-rendering web content responsive to a search query to improve user online experience.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
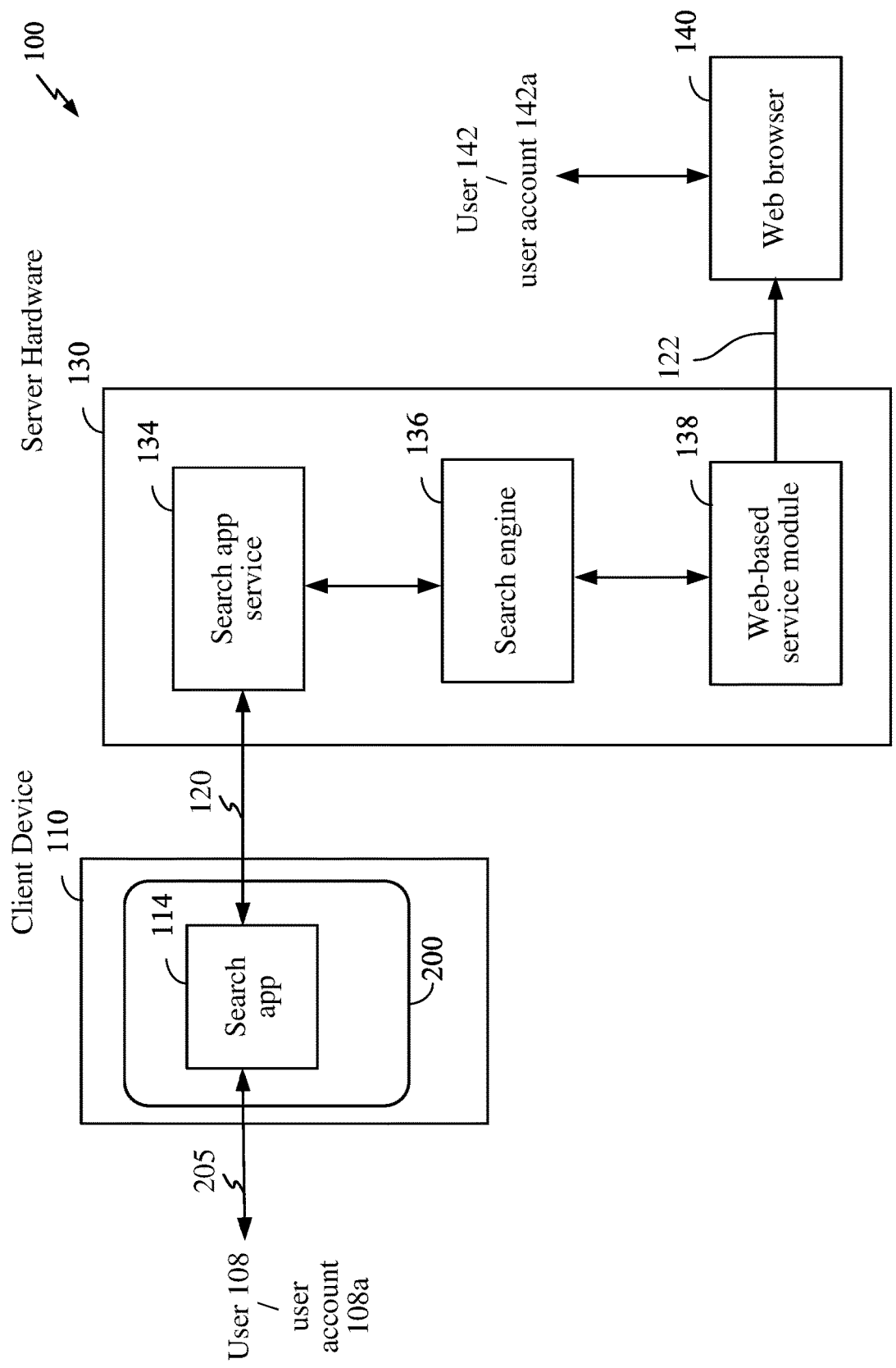
FIG. 1 illustrates an implementation of a client-server communication system supporting a search application (also denoted "search app" herein) running on a mobile device according to the present disclosure.

FIG. 1 illustrates an implementation of a client-server communication system 100 supporting a search application (also denoted "search app" herein) running on a mobile device according to the present disclosure. Note FIG. 1 is shown for illustrative purposes only, and is not meant to limit the scope of the present disclosure to any particular implementations shown.

In FIG. 1, user 108 may directly communicate with a client device 110 (also denoted herein as "client" or "device"), corresponding to a hardware module configured to run an operating system, such as iOS, Android, Windows Phone, etc. Device 110 may be, e.g., a smartphone, tablet, desktop computer, mobile phone, laptop, etc., and may include a display 200. The operating system running on device 110 may support a variety of applications, including search app 114 designed to search for and retrieve content from over a network. Search app 114 may be, e.g., a web search engine application, shopping search application, housing or rental listings search application, etc.

Search app 114 is configured to communicate with user 108 via user interface 205. For example, user 108 may input to device 110 a text string or any input query relating to content desired by user 108. Search app 114 may process such input query to retrieve a plurality of relevant search results to be displayed to user 108 via user interface 205.

Figure 2:
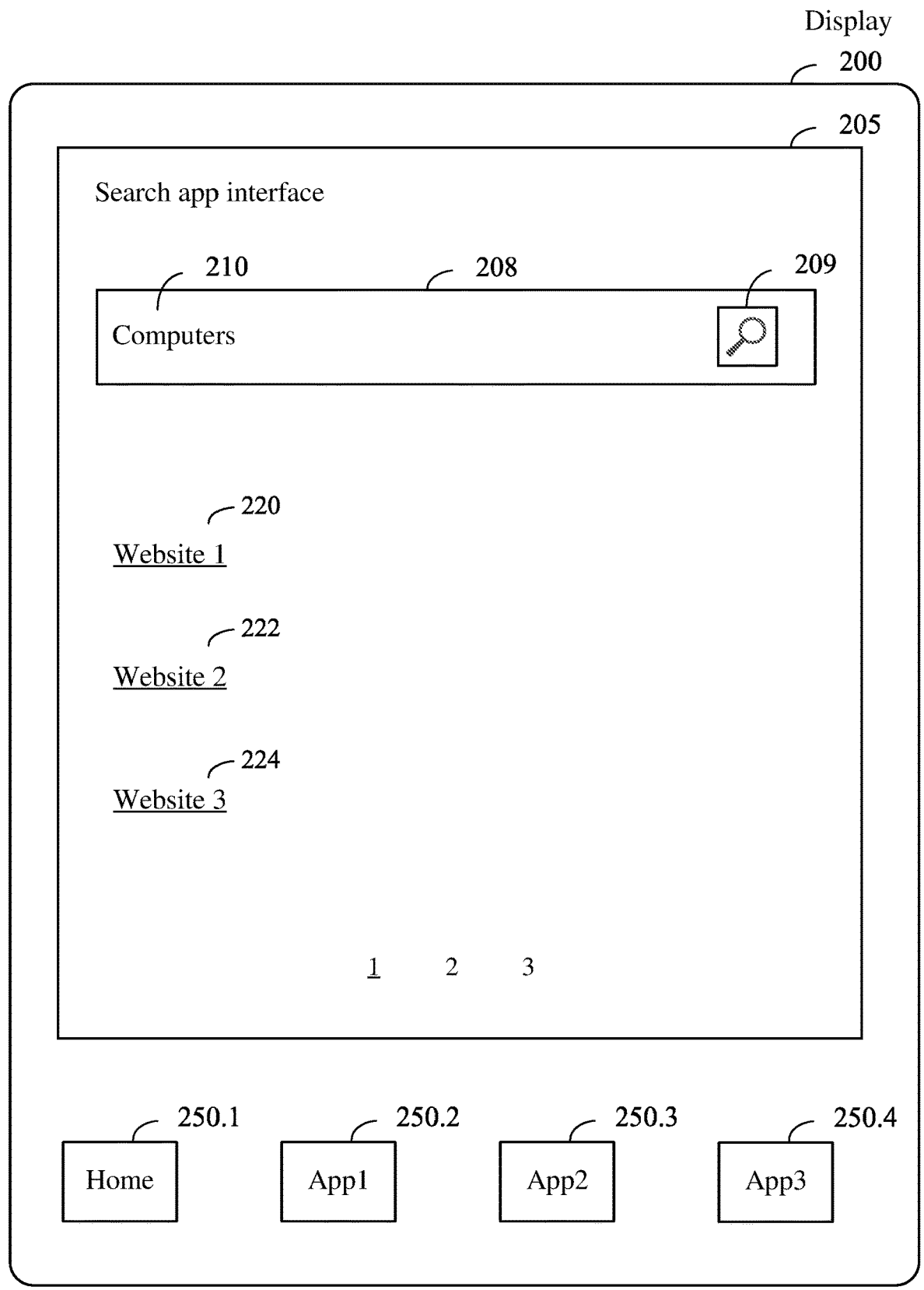
FIG. 2 illustrates an exemplary embodiment of a user interface displayed to users by a search app in the context of a web search engine application.

FIG. 2 illustrates an exemplary embodiment of user interface 205 displayed to user 108 by search app 114 in the context of a web search engine application. Note FIG. 2 is shown for illustrative purposes only, and is not meant to limit the scope of the present disclosure to web search engine applications, or any particular formats shown for interfaces or displays.

In FIG. 2, display 200 of device 110 shows user interface 205 for search app 114, wherein interface 205 occupies a portion of the total area of display 200. Besides interface 205, display 200 also shows home button 250.1 and app buttons 250.2, 250.3, 250.4, allowing the user to switch to other applications besides search app 114.

Within interface 205, search bar 208 receives search query 210 from user 108, corresponding to, e.g., a text string. A search button 209 may be clicked by user 108 to initiate the search. For illustrative purposes, user 108 is shown as having entered the text string "computers" for the search query 210.

Upon receiving search query 210, search app 114 proceeds to retrieve and display a plurality of search results 220, 222, 224 relevant to the query, e.g., in the format of a search engine results page (SERP). In particular, it is desirable for search results 220, 222, 224 to be relevant to search query 210, and also ranked by order of relevance to query 210. To identify and rank search results from a potentially vast number of possibilities, e.g., online documents and media available on the World Wide Web, sophisticated algorithms incorporating advanced techniques such as machine learning and classification algorithms may be utilized to identify content most likely to satisfy a search query. However, such techniques may require dedicated computational resources that may be difficult to provide on device 110, which may be a mobile device having limited power and bandwidth.

In an implementation, search app 114 may retrieve the plurality of search results 220, 222, 224 from over a network, e.g., from separate server hardware having greater computational resources than client device 110. Returning to FIG. 1, client device 110 may communicate over communications channel 120 with server hardware 130 (or "server"). Server 130 may include, e.g., computing servers such as database servers, web servers, file servers, mail servers, application servers, etc. Such servers may include one or more computers operating in tandem, e.g., distributed or parallel processing systems.

In an implementation, server 130 processes search queries from search app 114, and utilizes specialized hardware and algorithms to retrieve and rank relevant search results. In particular, server 130 may run a software application such as search app service 134 to communicate over channel 120 with search app 114 on client device 110. To generate relevant search results, search app service 134 may access a search engine 136, designed to perform content indexing and ranking of online content by relevance. The ranked results generated by search engine 136 may be provided to search app service 134, and then returned to device 110 for display to user 108, e.g., as the plurality of search results 220, 222, 224 shown in FIG. 2.

In an exemplary embodiment, search engine 136 may utilize the same or similar computational and indexing hardware as used by dedicated online search engines accessible by general web browsers (also denoted "web-based search services"), e.g., running on personal computers or mobile devices. Such online search engines may, e.g., utilize a Web-based service module 138 to interface with a Web browser 140 over an IP communications channel 122.

In certain cases, user 142 of web browser 140 may log into Web-based service module 138 or Web browser 140 using a user account 142a, and Web-based service module 138 may customize the search results retrieved by search engine 136 based on user account 142a. For example, Web-based service module 138 may tailor the retrieved search results to user-specific preferences, including preferred websites associated with account 142a, preferred geographical locations, records of previous searches, frequently visited websites, etc., as further described hereinbelow.

In an exemplary embodiment, user 108 may log into search app 114 using the same user account as he or she uses when accessing Web-based search services via Web browser 140. For example, user 108 and user 142 may be the same person, and user account 108a and user account 142a may be the same user account. In this case, search app service 134 may leverage the same user-specific profile data associated with user account 142a to serve relevant search results to user 108, who is logged into search app 114 using user account 108a, and vice versa.

In an exemplary embodiment, in addition to capabilities of a general web browser 140, search app 114 may perform several functions, including collecting specific data from device 110 to transmit to server 130 to aid in refining and tailoring search results. For example, such data may be associated with usage of device 110. Furthermore, search app 114 may support pre-fetching and/or pre-rendering of top search results received from server 130 to enhance the experience of user 108, as further described hereinbelow with reference to FIGS. 3A, 3B, and 4.

In general, after a plurality of ranked search results (e.g., results 220, 222, 224) are presented by search app 114 via interface 205, user 108 will select one of the results to view the corresponding content. In certain implementations, after the user 108 selects a result, client device 110 may retrieve the corresponding content over communications link 120 from server 130. In cases wherein such content includes large amounts of data, there will generally be a delay or latency between when the user selects a result (e.g., clicks on a link to the result) and when the content is fully retrieved by device 110. Such delay may arise from, e.g., speed of the connection 120, the amount of content to be loaded, etc.

It will be appreciated that long delays are undesirable and negatively impact the user experience. Accordingly, it would be desirable to provide techniques to decrease latency in search app 114, by pre-fetching and pre-rendering content in an optimized and efficient manner.

Figure 3A:
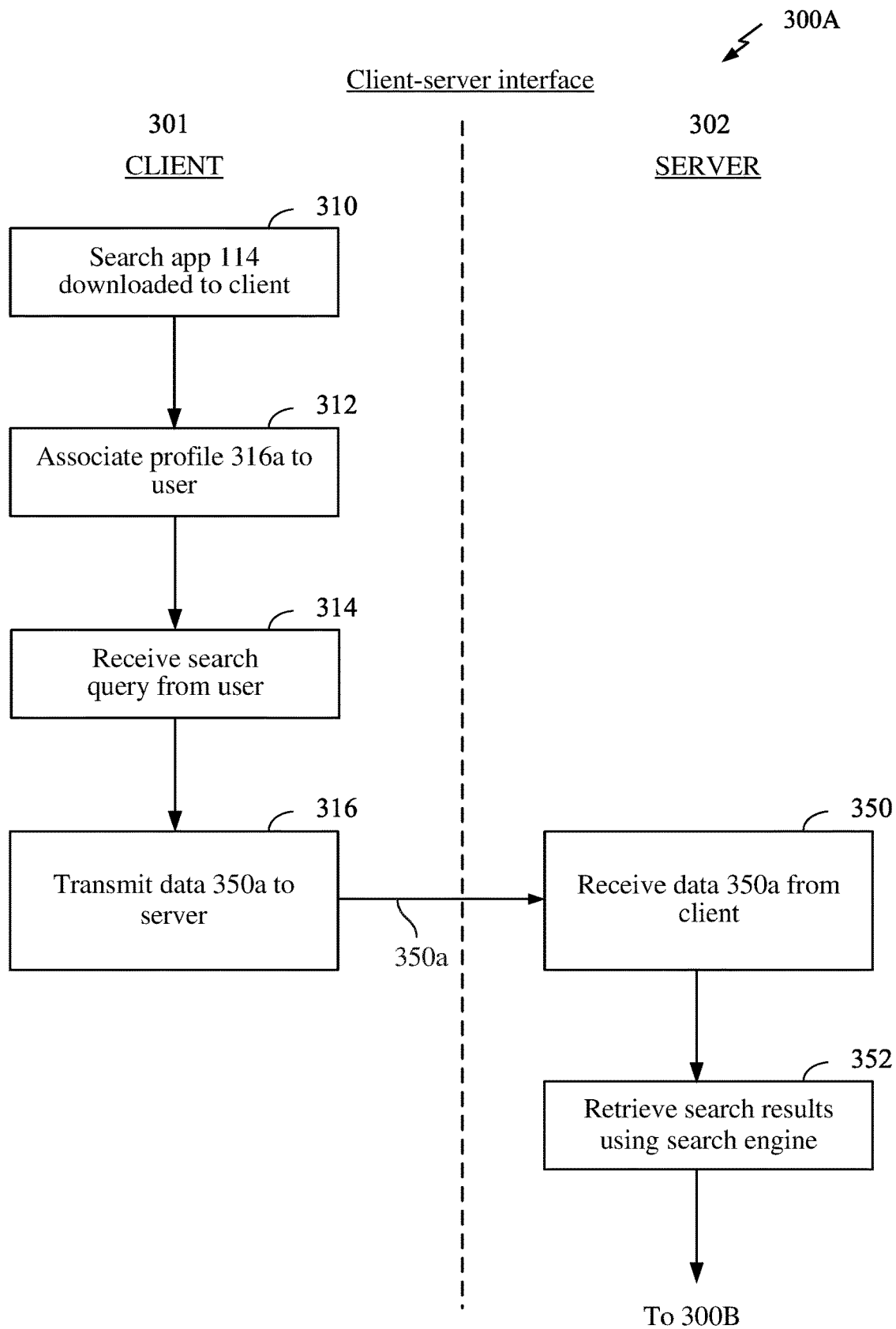
FIGS. 3A and 3B illustrate an exemplary embodiment of a method according to the present disclosure.
Figure 3B:
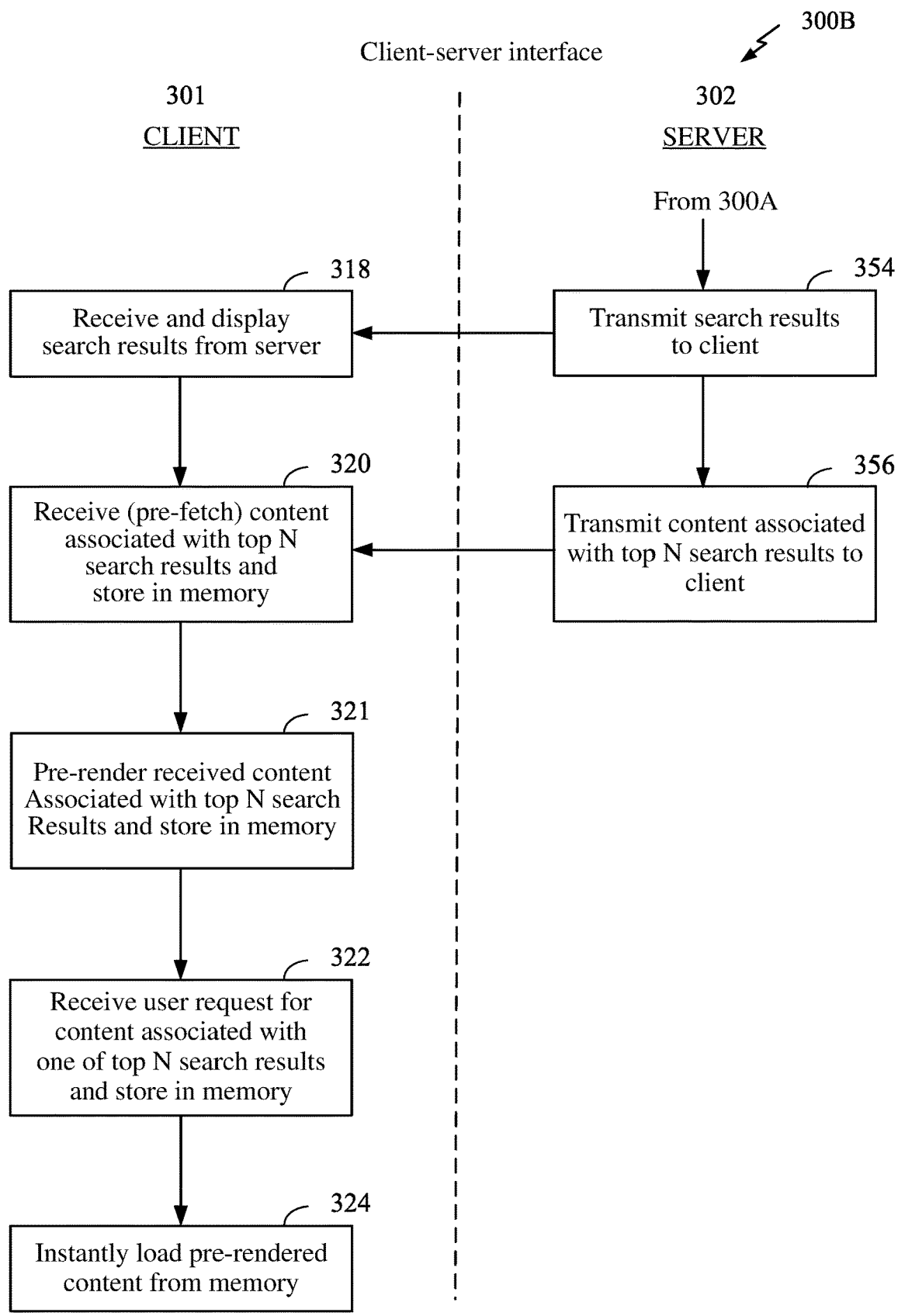

FIGS. 3A and 3B illustrate an exemplary embodiment of a method according to the present disclosure, shown in two parts 300A and 300B for ease of illustration. Note FIGS. 3A, 3B are shown for illustrative purposes only, and are not meant to limit the scope of the present disclosure to any particular method shown. In FIGS. 3A and 3B, operations performed by client device 110 are shown on left side 301, while operations performed by server 130 are shown on right side 302.

At block 310 of FIG. 3A, search app 114 is initially downloaded to client device 110. In an exemplary embodiment, users may download search app 114 to their devices, e.g., from an online source or via another external connection. For example, using exemplary client device 110.1 shown in FIG. 4, software for search app 114 may be downloaded using communications block 440, and stored in memory 430 as search app code 432. Alternatively, search app 114 may come pre-installed on the client device, e.g., in memory 430, when the device is purchased.

At block 312, profile 316a is associated with user 108 by search app 114. In an exemplary embodiment, profile 316a may include a user profile component, e.g., identity of user account 108a and associated data, e-mail address, real name, physical address, phone number, search history, user-specified preferences including hobbies, etc. Such user profile information may be input by the user to search app 114, or to other applications or software on device 110 and subsequently retrieved by search app 114 therefrom.

As previously described hereinabove, user account 108a may correspond to another previously created user account (such as account 142a), and can accordingly be utilized by search app 114 to leverage the usage patterns of the user, e.g. search history, previous visited locations, IP address, etc., as collected from other devices accessed through the user account. Profile 316a may further include a device profile component, including identification or serial numbers of the device, IP addresses, etc.

At block 314, search app 114 receives a search query from user 108. In an exemplary embodiment, user 108 may directly input text via a physical or virtual keyboard, or via copy and paste, speech to be interpreted by voice recognition, etc. For example, using exemplary client device 110.1 shown in FIG. 4, user 108 may use display/user interface 410 to input the search query.

At block 316, search app 114 collects and transmits data 350a to server 130 to commence the search. In an exemplary embodiment, data 350a may include profile 316a (including user profile and/or device profile), search query 316b, and other use parameters 316c. In an exemplary embodiment, other use parameters 316c may include parameters associated with device usage that facilitate personalization of search results, e.g., GPS location of device 110, time of day, other applications concurrently running on device 110, amount of available computing or memory resources on device 110, etc. Use parameters 316c may also include the usage history of search app 114 on device 110, including previous search queries, times associated with previous usages, links previously navigated to, and/or processed versions of such data. For example, using exemplary client device 110.1 show in FIG. 4, communications block 440 may be used to transmit data 350a from the client to the server.

While data 350a transmitted from the client to server may include all of profile 316a, search query 316b, and other use parameters 316c, it will be appreciated that in some instances, not all of these items need be transmitted together. For example, in certain transmissions, data 350a may include only search query 316b, and server 130 may infer information regarding profile 316a and/or other use parameters 316c from other sources. For example, other use parameters 316c may be inferred from previous transmissions, profile 316a may be inferred from other identifying information present in transmitted search query 316b, etc. Such alternative exemplary embodiments are contemplated to be within the scope of the present disclosure.

At block 350, server 130 receives data 350a from client device 110.

At block 352, to retrieve and rank relevant search results, server 130 provides the received data 350a to a search engine, e.g., search engine 136 in FIG. 1.

In cases where such data is available, personalization data may be utilized by the search engine to refine the retrieval and ranking of search results responsive to the search query. For example, if profile 316a includes a user account 108a that matches a corresponding user account 142a for a user 142 of search engine 136 through web browser 140 and/or web-based access service 138, then the same or similar configurations and optimizations available for user account 142a may be loaded and utilized by search engine 136 when retrieving search results for user 108.

As an illustration of this feature, user 142 may utilize Web browser 140 from a desktop computer, while logged in with user account 142a. During these sessions, user 142 may input search queries such as "gym in San Francisco" and "German bakery in San Francisco" to search engine 136. Responsive to these queries, search engine 136 may retrieve a plurality of results, and further log the typed queries and most relevant search results (e.g., as determined from user click-through rates) for analysis and update. Based on the profile-specific logs and analysis, search engine 136 may learn, for example, that search results corresponding to the location "San Francisco" are most relevant to user 142 of account 142a. In an exemplary embodiment, the analysis and update may be implemented using, e.g., machine learning techniques to train search engine 136 to provide more relevant results to user 142.

If user 108 of search app 114 subsequently logs into search app 114 using an identical user account 142a (e.g., user 108 and user 142 are the same person), then search engine 136 may advantageously use the same optimizations associated with (e.g., learned or otherwise derived for) account 142a to serve search results responsive to queries performed by user 108. For example, if user 108 logs into search app 114 using account 142a and types a search query such as "car dealership," then search app 114 may automatically rank car dealerships located in San Francisco more highly than car dealerships located elsewhere, based on the history already associated with user account 142a.

At block 354 of FIG. 3B, the search results retrieved at block 352 are transmitted from server 130 back to client 110.

At block 318, the search results from server 130 are received and displayed on device 110, e.g., on interface 205. For example, using exemplary client device 110.1 shown in FIG. 4, the communications block 440 may be used to receive data from the server, and display/user interface 410 may be used to display the results.

At block 356, content associated with the top N ranked search results is also transmitted from server 130 to client 110, wherein N may correspond to 1, 2, 3, etc. Such content may include, e.g., HTML, text, images, audio, video, scripts, etc. The content may correspond to what is displayed to user 108 on interface 205 when the corresponding ranked search result is selected from the SERP.

In an exemplary embodiment, N may be pre-configured as a fixed number, or it may be dynamically adjustable. For example, N may be increased or decreased depending on the quality of channel 120, or explicit request by device 110, or based on the processing or memory bandwidth of device 110 as reported in, e.g., other use parameters 316c. In an exemplary embodiment (not shown), the value of N may be separately communicated by client 110 to server 130 using dynamic signaling not explicitly illustrated in FIG. 3B. Such alternative exemplary embodiments are contemplated to be within the scope of the present disclosure.

At block 320, the content for the top N search results is received or "pre-fetched" by device 110 and stored in local memory. For example, using exemplary client device 110.1 shown in FIG. 4, processor 420 may store the downloaded content 434 in memory 430.

Note FIG. 3B is not meant to imply that block 318 necessarily precedes block 320 in order of execution by client device 110. For example, receiving content of the top N ranked search results may be performed prior to, or concurrently with, receiving and displaying the identities (and, e.g., corresponding description titles or "snippets") of those search results on an SERP through interface 205.

In an exemplary use scenario, a top search result generated responsive to a search query such as "car dealership" may correspond to a webpage for "Mike's Auto Dealership" in San Francisco. In this specific instance, then, server 130 may retrieve the content of the webpage for "Mike's Auto Dealership," and transmit such webpage content to client device 110 at block 356. Similarly, server 130 may retrieve the content of second or third (e.g., depending on N)

webpages corresponding to the next highest ranked search results, and transmit them to client device 110.

At block 321, the downloaded content from server 130 is pre-rendered at device 110. In particular, after content for the top N search results are received from server 130 at block 320, such content may be pre-rendered for subsequent display on interface 205 of display 200. Pre-rendering may include, e.g., rendering for display certain images, graphic layouts, videos, etc., by processors (not shown) on device 110. For example, using exemplary client device 110.1 shown in FIG. 4, pre-rendered content may correspond to content 436 as stored in memory 430.

Note pre-fetching and pre-rendering are both performed prior to the user explicitly clicking on a corresponding search result, in anticipation of user 108 eventually clicking on the result. If the user does click on the result, then this feature advantageously creates the impression for the user that the content is instantaneously loaded after clicking. The top N highest ranked search results are expected to be highly relevant to the search query, based on the availability of profile 316a and other use parameters 316c, and further powerful optimized search algorithms executed by server 130. Accordingly, the benefit of providing user 108 with seemingly instantaneous access to content of the top N highest ranked results may justify the resources expended to pre-fetch and/or pre-render that content.

It will further be appreciated that the content retrieved at blocks 356, 320, and pre-rendered at block 321 can be stored in a memory of device 110 for display. In an exemplary embodiment, pre-rendered content is not displayed to user 108 on display 200 until the user explicitly navigates to, e.g., clicks on, the URL corresponding to the pre-fetched and pre-rendered content in the SERP. This "hidden view" feature advantageously avoids cluttering display 200 with content the user has not otherwise explicitly requested.

At block 322, upon viewing the full list of relevant search results retrieved at block 318, device 110 receives a user request for content associated with one of the search results displayed. For example, using exemplary client device 110.1 shown in FIG. 4, the user clicks a link to one of the search results shown on display/user interface 410 in FIG. 4. If the requested content is for one of the top N (pre-fetched and pre-rendered) results, then the method may proceed to block 324. Otherwise, the content may be fetched from server 130 and rendered following selection by the user.

At block 324, pre-fetched and pre-rendered content is loaded immediately from memory, e.g., based on processing already performed at blocks 320, 321, and displayed on display 200. For example, using exemplary client device 110.1 shown in FIG. 4, the results are shown on display/user interface 410 in FIG. 4.

In an alternative exemplary embodiment (not shown), pre-rendering at block 321 may be omitted. In particular, after content is pre-fetched at block 320, client device 110 may wait for a user request for content at block 322 prior to rendering the requested content. Such an exemplary embodiment would ease the computational resources and memory required for implementing the techniques described herein, at the cost of increased latency between user's request and display of the requested content compared to a pre-fetching and pre-rendering embodiment of the present disclosure.

In an exemplary embodiment, pre-fetching and/or pre-rendering of content need not be limited only to the top N highest ranked search results. In particular, content associated with webpages listed on a "whitelist" may also be automatically pre-fetched and/or pre-rendered. Such a whitelist may include, e.g., popular websites such as "News" or other pages that are known to receive a large number of site visits. Historical click-through data for a given user may also be utilized to identify content to be pre-fetched and/or pre-rendered.

For example, if a user's history shows that the user often clicks on a link to a particular website, e.g., using search app 114 or other applications running on device 110, then such website may also be a candidate for being pre-fetched and/or pre-rendered. Furthermore, links currently visible on the display of device 110 may also be candidates for content pre-fetching and/or pre-rendering.

Figure 4:
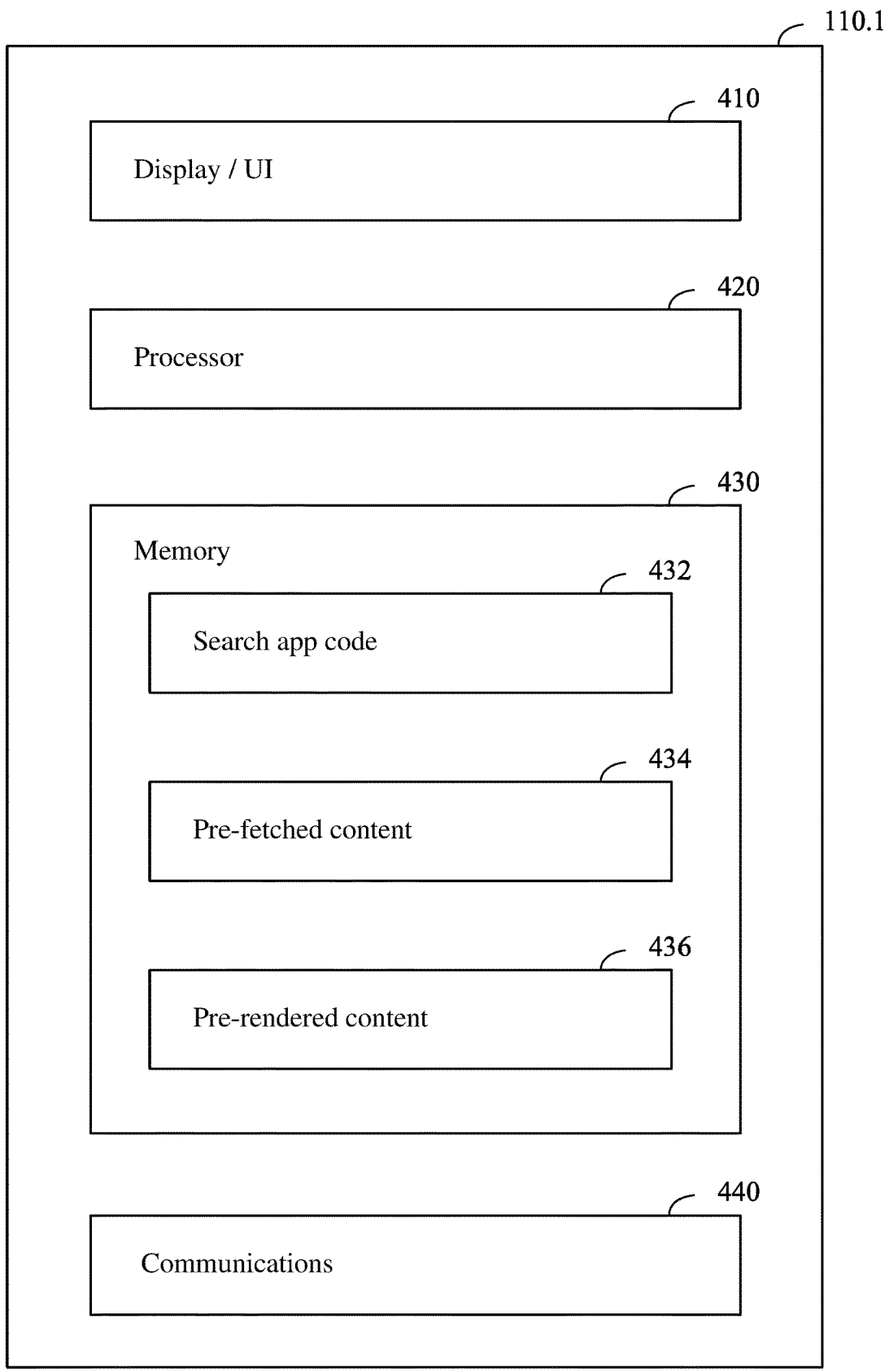
FIG. 4 illustrates an exemplary embodiment of a client device.

FIG. 4 illustrates an exemplary embodiment 110.1 of client device 110. Note device 110.1 is shown for illustrative purposes only, and is not meant to limit the scope of the present disclosure to any particular implementation of client device 110. In certain exemplary embodiments, any of the functional blocks shown may be structurally or functionally integrated with other blocks, e.g., the processor, memory, and communications blocks may be integrated in a single system block. Such alternative exemplary embodiments are contemplated to be within the scope of the present disclosure.

Device 110.1 includes display/user interface 410, processor 420, memory 430, and communications block 440. Communications block 440 contains circuitry for transmitting and receiving messages between client device 110.1 and server 130.

Memory 430 stores search app code 432, e.g., downloaded to device 110.1 at block 310 of FIG. 3. Memory 430 further stores pre-fetched content 434, e.g., content of top N search results or other content as pre-fetched from server 130 at block 320. Following pre-rendering, e.g., of pre-fetched content 434 performed at block 321 of FIG. 3B, memory 430 stores the pre-rendered content 436. Note in exemplary embodiments wherein pre-rendering is not performed, memory 430 need not store pre-rendered content 436. Alternatively, pre-rendered content 436 may selectively replace pre-fetched content 434 in memory 430 when pre-fetched content 434 is no longer needed. Such alternative exemplary embodiments are contemplated to be within the scope of the present disclosure.

Figure 5:
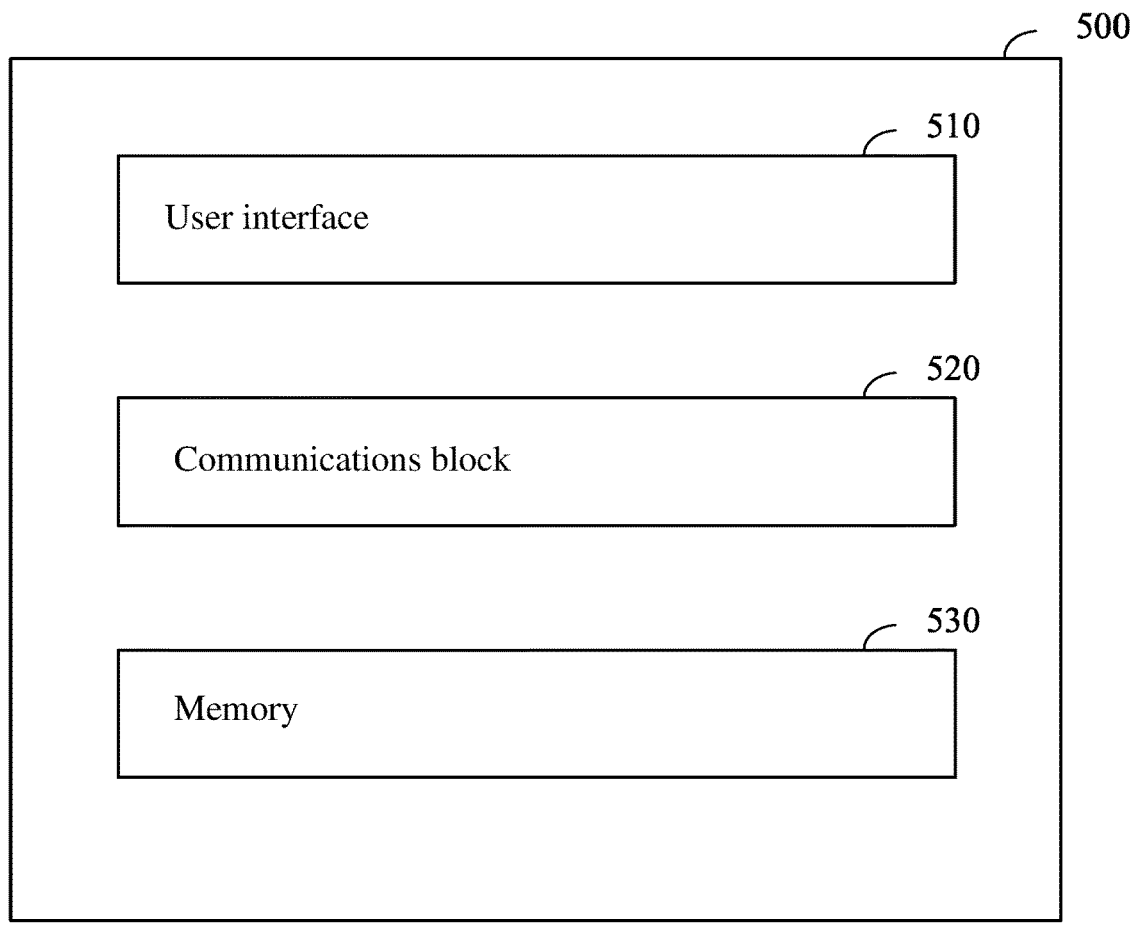
FIG. 5 illustrates an exemplary embodiment of an apparatus for implementing functionality of a client device according to the present disclosure.

FIG. 5 illustrates an exemplary embodiment of an apparatus 500 for implementing functionality of a client device according to the present disclosure. Note apparatus 500 is shown for illustrative purposes only, and is not meant to limit the scope of the present disclosure to any particular method shown.

In FIG. 5, apparatus 500 includes a user interface 510 configured to receive a search query from a user, the user associated with a profile; a communications block 520 configured to transmit the search query and the profile, receive a plurality of ranked search results corresponding to the search query and the profile, and pre-fetch content prior to the user selecting one of the plurality of ranked search results; and a memory 530 configured to store the pre-fetched content. The user interface 510 may further be configured to display the pre-fetched content upon user selection of one of the plurality of ranked search results.

Figure 6:
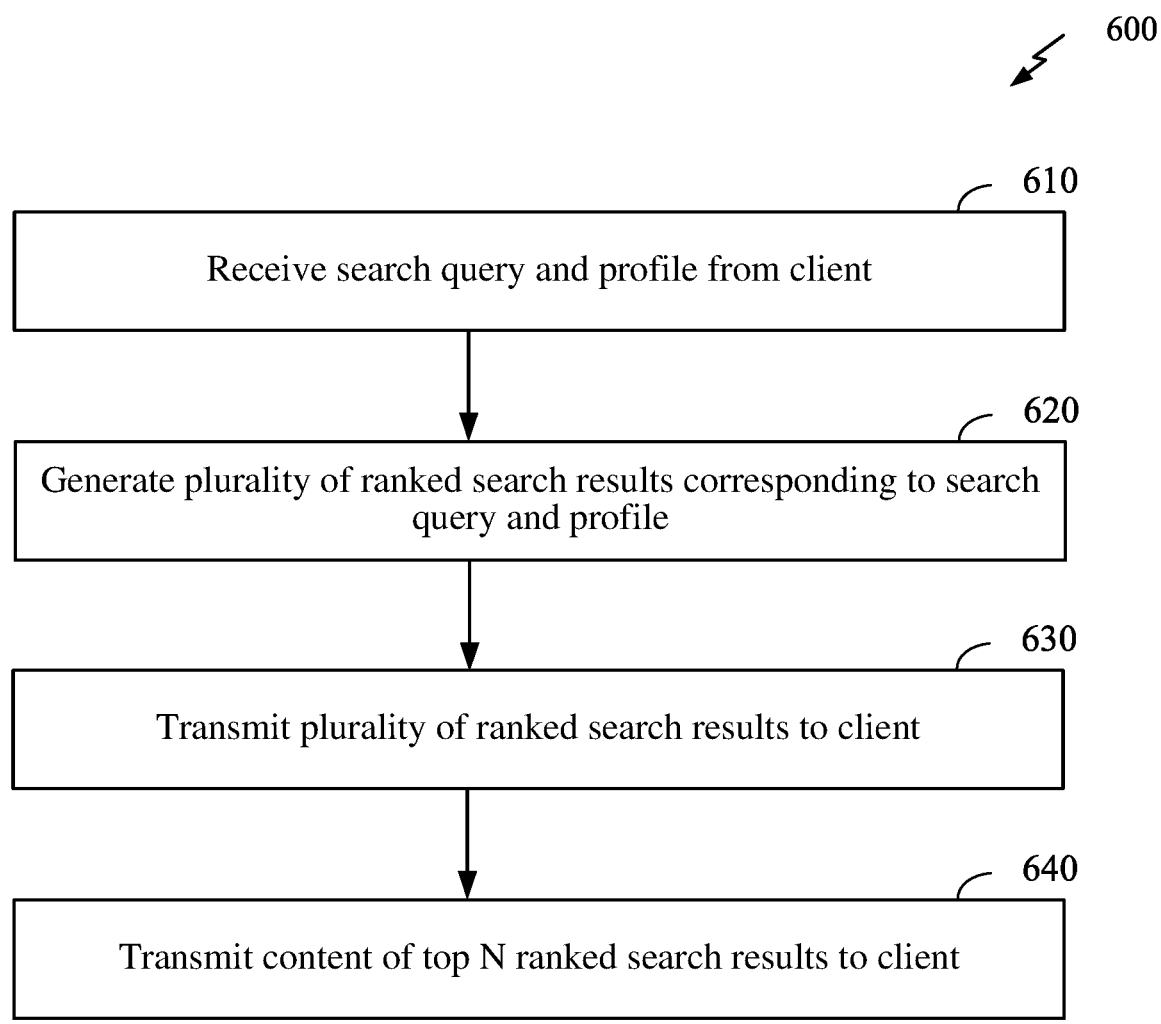
FIG. 6 illustrates an exemplary embodiment of a method that may be performed at a server according to the present disclosure.

FIG. 6 illustrates an exemplary embodiment of a method 600 that may be performed at a server according to the present disclosure. Note method 600 is shown for illustrative purposes only, and is not meant to limit the scope of the present disclosure to any particular method shown.

In FIG. 6, at block 610, a search query and a profile are received from a client.

At block 620, a plurality of ranked search results is generated corresponding to the search query and the profile.

At block 630, said generated plurality of ranked search results is transmitted to the client.

At block 640, content of the top N ranked search results is transmitted to the client prior to receiving a request for content from the client.

Figure 7:
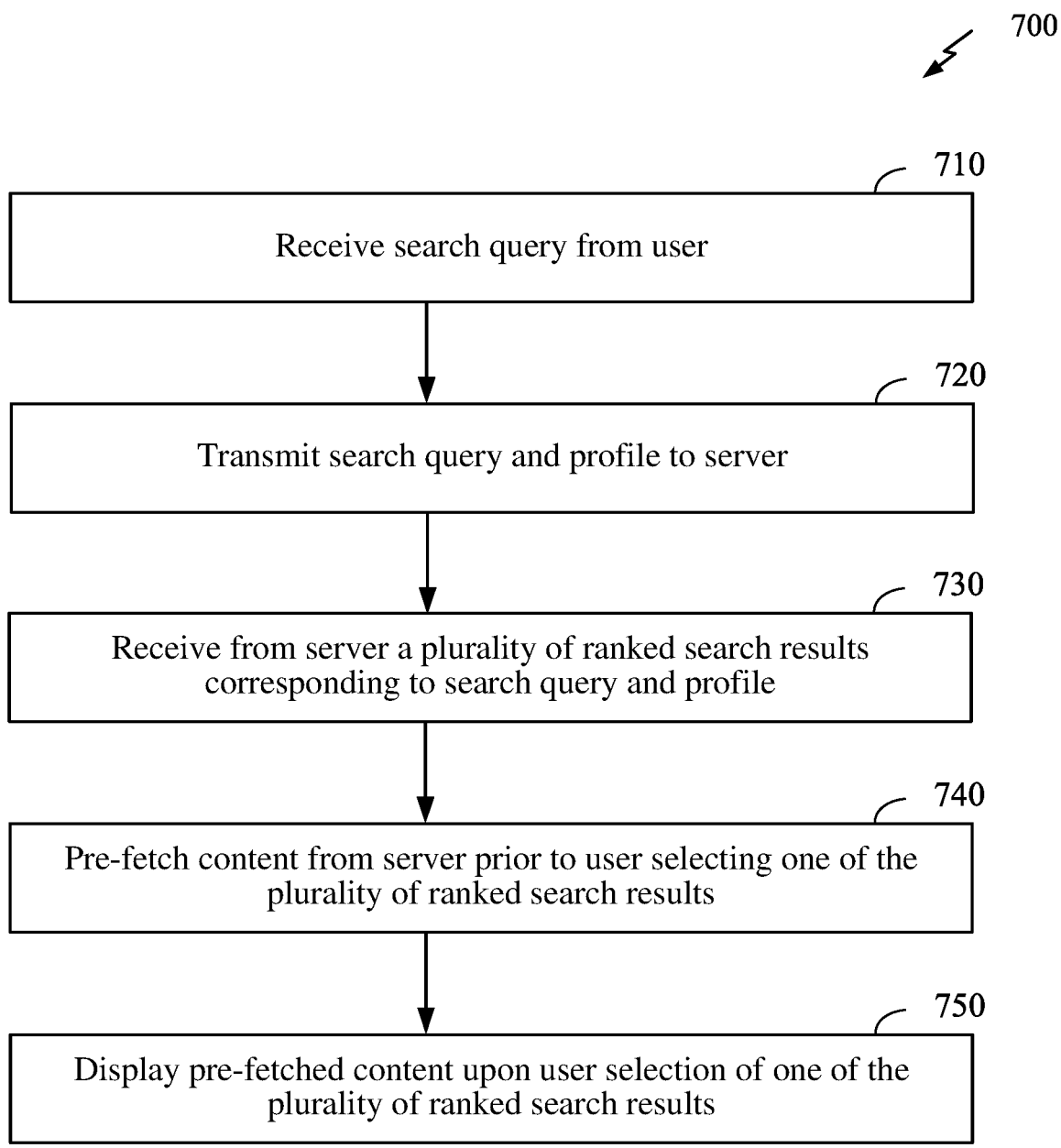
FIG. 7 illustrates an exemplary embodiment of a method that may be performed at a client device according to the present disclosure.

FIG. 7 illustrates an exemplary embodiment of a method 700 that may be performed at a client device according to the present disclosure. Note method 700 is shown for illustrative purposes only, and is not meant to limit the scope of the present disclosure to any particular method shown.

In FIG. 7, at block 710, a search query is received from a user. The user may be associated with a profile.

At block 720, the search query and profile may be transmitted to a server.

At block 730, a plurality of ranked search results corresponding to the search query and the profile may be received from the server.

At block 740, content may be pre-fetched from the server prior to the user selecting one of the plurality of ranked search results. The content may correspond to at least one of the plurality of ranked search results.

At block 750, the pre-fetched content may be displayed upon user selection of one of the plurality of ranked search results.

In an exemplary embodiment, the pre-fetched content corresponds to at least one of the plurality of ranked search results having the highest ranking.

Figure 8:
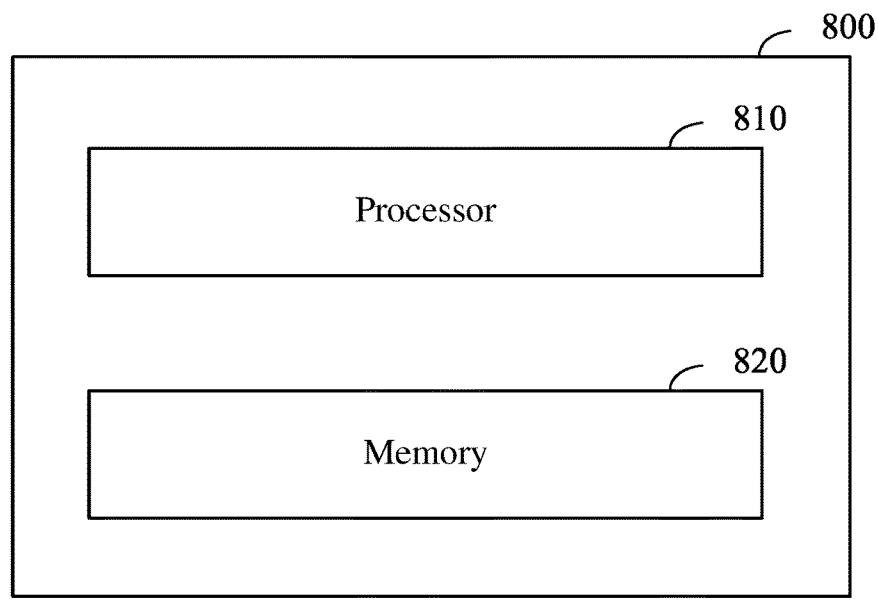
FIG. 8 illustrates an exemplary embodiment of a computing device according to the present disclosure.

FIG. 8 illustrates an exemplary embodiment of a computing device 800 including a memory 810 holding instructions executable by a processor 820 to: receive a search query from a user, the user associated with a profile; transmit the search query and the profile to a server; receive a plurality of ranked search results corresponding to the search query and the profile from the server; pre-fetch content from the server prior to the user selecting one of the plurality of ranked search results, the content being associated with at least one of the plurality of ranked search results; and display the pre-fetched content upon user selection of one of the plurality of ranked search results.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A mobile client apparatus comprising:
   a user interface controlled by a search app executed by a processor of the mobile client apparatus, the user interface configured to receive a search query from a user associated with a user profile;
   a communications block controlled by the search app, the communications block configured to:
      transmit the search query, the user profile, and device usage parameters to a search app service;
      receive a plurality of search results ranked by relevance to the search query, the user profile, and device usage parameters, and;
      pre-fetch content for the plurality of ranked search results prior to a user selecting one of the plurality of ranked search results; and
   a memory configured to store the pre-fetched content;
   the user interface further configured by the search app to:
      receive, from the user, a selection of one of the plurality of ranked search results; and
      display pre-fetched content corresponding to the selection of the one of the plurality of ranked search results;
   wherein the device usage parameters comprise data derived from applications other than the search app executed by the mobile client apparatus.

2. The mobile client apparatus of claim 1, wherein the pre-fetched content corresponds to at least one of the plurality of ranked search results having the highest ranking.

3. The mobile client apparatus of claim 1, further comprising:
   a processor configured to pre-render the pre-fetched content for the plurality of ranked search results prior to the user selection of the one of the plurality of ranked search results;
   the memory configured to store the pre-rendered content for the plurality of ranked search results.

4. The mobile client apparatus of claim 1, a processor configured to render the pre-fetched content corresponding to the selection of the one of the plurality of ranked search results.

5. The mobile client apparatus of claim 2, the pre-fetched content further comprising content associated with a whitelist of pre-determined webpages.

6. The mobile client apparatus of claim 2, the memory further configured to store a record of webpages previously accessed by the user, the pre-fetched content further comprising content associated with a webpage previously accessed by the user.

7. The mobile client apparatus of claim 1, the user interface configured to display a portion of the plurality of ranked search results received corresponding to the search query and the user profile from a server.

8. The mobile client apparatus of claim 1, the user profile identifying characteristics of the user.

9. The mobile client apparatus of claim 8, the user profile corresponding to a same user profile used to log into a web-based search engine application.

10. The mobile client apparatus of claim 1, the device usage parameters further comprising an identity of other applications running on the mobile client apparatus.

11. The mobile client apparatus of claim 1, the user interface further configured to display a webpage associated with the pre-fetched content corresponding to the selection of the one of the plurality of ranked search results.

12. A method comprising:
receiving a search query from a user using a user interface controlled by a search app executed by a processor of a mobile device, the user associated with a user profile;
transmitting the search query, the user profile, and device usage parameters to a server;
receiving from the server a plurality of search results ranked by relevance to the search query, the user profile, and device usage parameters;
pre-fetching content for the plurality of ranked search results from the server prior to the user selecting one of the plurality of ranked search results;
receiving, from the user, a selection of one of the plurality of ranked search results; and
displaying pre-fetched content corresponding to the selection of the one of the plurality of ranked search results;
wherein the device usage parameters comprise data derived from applications other than the search app executed by the mobile device.

13. The method of claim 12, wherein the pre-fetched content corresponding to the selection of the one of the plurality of ranked search results corresponds to at least one of the plurality of ranked search results having the highest ranking.

14. The method of claim 12, further comprising:
pre-rendering the pre-fetched content corresponding to the selection of the one of the plurality of ranked search results prior to the user selection.

15. The method of claim 12, further comprising:
rendering the pre-fetched content corresponding to the selection of the one of the plurality of ranked search results after the user selection.

16. The method of claim 13, the pre-fetched content for the plurality of ranked search results further comprising content associated with a whitelist of pre-determined webpages.

17. The method of claim 13, further comprising:
storing a record of webpages previously accessed by the user, the pre-fetched content for the plurality of ranked search results further comprising content associated with a webpage previously accessed by the user.

18. A method comprising:
receiving a search query, a user profile, and device usage parameters from a mobile client apparatus;
generating a plurality of search results ranked by relevance to the search query, the profile, and the device usage parameters;
transmitting said generated plurality of ranked search results to the mobile client apparatus;
transmitting content of a plurality of top N ranked search results to the mobile client apparatus prior to receiving a request for content from the mobile client apparatus;
receiving, from the user, a selection of one of the plurality of top N ranked search results; and
displaying pre-fetched content corresponding to the selection of the one of the plurality of top N ranked search results;
wherein the device usage parameters comprise data derived from applications other than a search application generating the plurality of search results.

19. The method of claim 18, said generating comprising applying an algorithm derived from machine learning, the algorithm modifying the ranking of the search results based on the user profile.

20. The method of claim 18, the user profile comprising use parameters associated with the mobile client apparatus.

* * * * *